March 20, 1962 R. S. FINE ET AL 3,026,378

STEREOPHONIC AUDIO-FREQUENCY SIGNAL AMPLIFIER SYSTEMS

Filed April 30, 1958 2 Sheets-Sheet 1

INVENTORS
ROY S. FINE &
SYDNEY V. PERRY
BY
H. L. Newton
ATTORNEY

STEREOPHONIC AUDIO-FREQUENCY SIGNAL AMPLIFIER SYSTEMS

Filed April 30, 1958 2 Sheets-Sheet 2

INVENTORS
ROY S. FINE &
SYDNEY V. PERRY
BY
ATTORNEY

United States Patent Office 3,026,378

Patented Mar. 20, 1962

3,026,378
STEREOPHONIC AUDIO-FREQUENCY SIGNAL AMPLIFIER SYSTEMS

Roy S. Fine and Sydney V. Perry, Haddonfield, N.J., assignors to Radio Corporation of America, a corporation of Delaware Filed Apr. 30, 1958, Ser. No. 732,031
15 Claims. (Cl. 179—100.1)

Figure 1A:
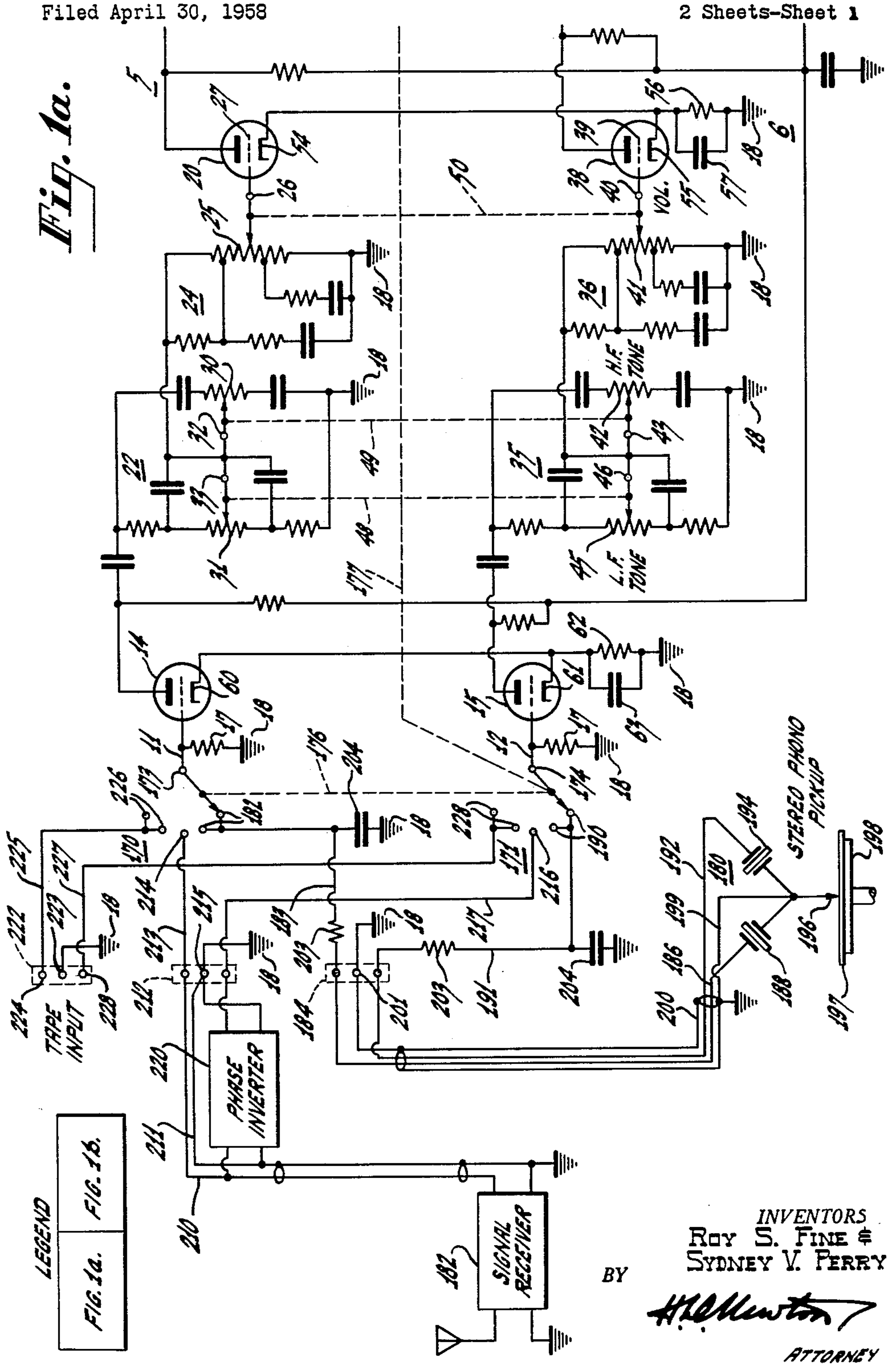

The present invention relates to audio-frequency signal amplifier systems for the home entertainment field, in radio, television, tape and phonograph-record-playing equipments, and combinations thereof, to drive sound-output speakers or speaker systems.

More particularly, the present invention relates to dual-channel audio-frequency signal amplifier systems of the type having two separate, substantially duplicate, amplifier channels and separate speaker output means for each channel, for streophonic sound reproduction in equipments of the above types now coming into the home entertainment field. For present most effective use in this field, it is considered that such equipments must be fully compatible, that is, provide both present standard monaural sound reproduction and the new stereophonic or dual-channel sound reproduction. Thus, the audio-frequency amplifier and speaker means provided for such equipments and primarily adapted for amplifying and reproducing dual-channel stereophonic sound signals, should also be adapted for amplifying and reproducing monaural or single-channel sound signals with equal facility and effectiveness.

It is, therefore, a primary object of the present invention, to provide an improved dual-channel audio-frequency amplifier system for stereophonic sound signals which is adapted for efficient, monaural signal amplification using both channels with full power output.

It is also an object of the present invention, to provide an improved, low-cost audio-frequency amplifier system for stereophonic or dual-channel signals which provides effective monaural or single-channel signal amplification with a minimum of circuit switching, and with reduced even-order harmonic distortion.

It is a further object of this invention, to provide an improved dual-channel, stereophonic signal amplifier system with dual output speaker means, which provides monaural signal amplification and reproduction as a push-pull amplifier system with single or dual output speaker means.

It is also a further and important object of the present invention, to provide an improved dual-channel audio-frequency signal amplifier system with two separate single-ended amplifying channels for stereophonic sound reproduction, which is adapted for monaural signal reproduction through both channels in push-pull or out-of-phase relation with the same power output as for stereophonic signal reproduction, and with effective reduction of even-order harmonic distortion.

For stereophonic signal amplification and reproduction, for example from the same source, such as a stereophonic double-track tape player or a stereophonic phonograph pickup, two separate amplifier channels are required, each with separate speaker output means. As a basic unit for such stereophonic signal reproduction, in accordance with the invention, and for simplicity and low cost, two substantially identical, transistor or electronic-tube single-ended amplifiers are provided and transformer-coupled to their respective speaker means. For stereophonic signal amplification, the two amplifiers operate independently but in connection with the same signal source, and each carries approximately half the total power transmitted through the system.

It is desirable, for reasons hereinbefore mentioned, to use such stereophonic signal amplifier systems for monaural audio-frequency signal amplification from present standard monaural sources, such as microphones, single-track tape players, monaural phonograph pickups, radio and television receivers, and the like. It is obvious that either channel could be used alone for that purpose, but then only half of the available power could be applied to the speakers for sound reproduction. To utilize the total available power, both amplifiers or amplifier channels must be used. This also may readily be done if the two amplifiers are duplicates and separate output speakers are used, as the input ends of the two amplifiers may then be connected in parallel with the monaural signal source and the amplifiers operated as parallel amplifying and reproducing channels for the monaural signals. With the amplifiers connected for parallel signal input and parallel channel operation, the output ends may also be connected in parallel in proper polarity for total power output to one speaker. However, the percentage distortion is the same as for either channel alone.

In accordance with the invention, the two normally separate stereophonic amplifiers or signal channels are connected for push-pull or out-of-phase operation from a monaural signal and from the out-of-phase components of a stereophonic signal.

For monaural signal reproduction from a strictly monaural source, the input ends of the two channels, that is, the input circuits of the two amplifiers of the stereophonic amplifier system, are connected with the same monaural signal source in parallel relation, but with signal phase-inversion means interposed between the source and one channel. In practice, a signal phase inverter, such as a single-stage amplifier with zero gain, is connected in circuit between the signal source and the input end of the one amplifier channel, while the input end of the other channel is directly connected with the signal source. Thus, the input signal to one channel is inverted, and for monaural signals, from a monaural source, the two channels thus operate in push-pull or out-of-phase relation.

In order that the two output signals from the two amplifiers or channels may further, in accordance with the invention, be in phase at the loud speakers or output circuits with like terminal polarities, a second inversion is made in the one channel. This follows the last amplifier stage and may be done by reversal of the connections to the output circuit for that channel. With transformer coupling in the output circuit, this involves reversing the connections to the primary or the secondary winding for that channel. Inversion at the primary is preferred in accordance with the invention, as it simplifies the circuitry and facilitates making the speaker and ground or chassis connections with the secondary winding terminals with the right polarities for proper speaker phasing. In this way, like terminals of both secondary windings may have signal voltages of the same polarity, whereby like terminals of the speakers may be connected to like secondary terminals for proper in-phase operation for stereophonic sound reproduction. Where a plurality of speakers are used, this simplification of the phasing problem is important.

Further in accordance with the invention, the output inversion permits the secondary windings to operate in in-phase relation and to be connected in parallel by simple switching means, without change in the remaining portions of the amplifiers and without disturbing the impedance matching with the respective speakers, thereby to provide for the reduction of even-order harmonics produced in the two amplifier channels, which are out of phase and so tend to cancel when the in-phase secondary windings are connected in parallel relation. Since the two amplifiers are thus arranged to operate in push-pull relation and one is phase inverted at the output end, the same action is provided for reduction of even-order harmonics as in a conventional push-pull amplifier, yet each channel comprises a relatively low-cost single-ended amplifier circuit. It has been found that a three-to-one reduction in total harmonic distortion may be obtained for the same signal input and total power output from that provided by operation of the two channels in parallel from a single monaural source.

When the signal source is a stereophonic phonograph pickup designed for the reproduction of sound from two-channel stereophonic phonograph records, two signals of equal amplitude but opposite in phase are provided when such a pickup is used for reproducing sound from ordinary monaural lateral-cut records. Therefore, these signals may be applied directly to the input ends of the two amplifier channels without additional phase inversion. Thus, for any "push-pull" or out-of-phase monaural signals, input phase inversion is not required with an amplifier system embodying the invention. However, output inversion in one channel, after the power output stage, is necessary in order to produce output signals in proper in-phase relation, for parallel connection of the output circuits. As hereinbefore described, even-order harmonic distortion generated in the amplifiers is transferred out of phase to the secondary windings of the output transformers, by reversal of one of the transformer primaries. Therefore, when the secondary or output circuits are connected in parallel these and any other out-of-phase components cancel. Also, when connected in parallel, both speakers or a single speaker may be used for monaural sound reproduction.

When the signal source is a stereophonic pickup, as above referred to, the interconnection of the two secondary windings, for in-phase parallel operation, provides a further advantage for monaural record reproduction through such pickup. Since, for the lateral signal output of the pickup, the two channels of the amplifier operate in push-pull or out-of-phase relation as described, monaural record reproduction through the stereophonic pickup involves no change in the pickup or its connections. Any undesired vertical response from the pickup results in signals transmitted through the two channels in-phase and these are cancelled in the output circuit with the secondaries connected in in-phase relation. Any undesired vertical rumble components are therefore transmitted as in-phase components in the two channels and thus cancel in the output circuits, as in the case of the even-order harmonics.

The invention will further be understood from the following description when considered in connection with the accompanying drawings, and its scope is pointed out in the appended claims.

Figure 1B:
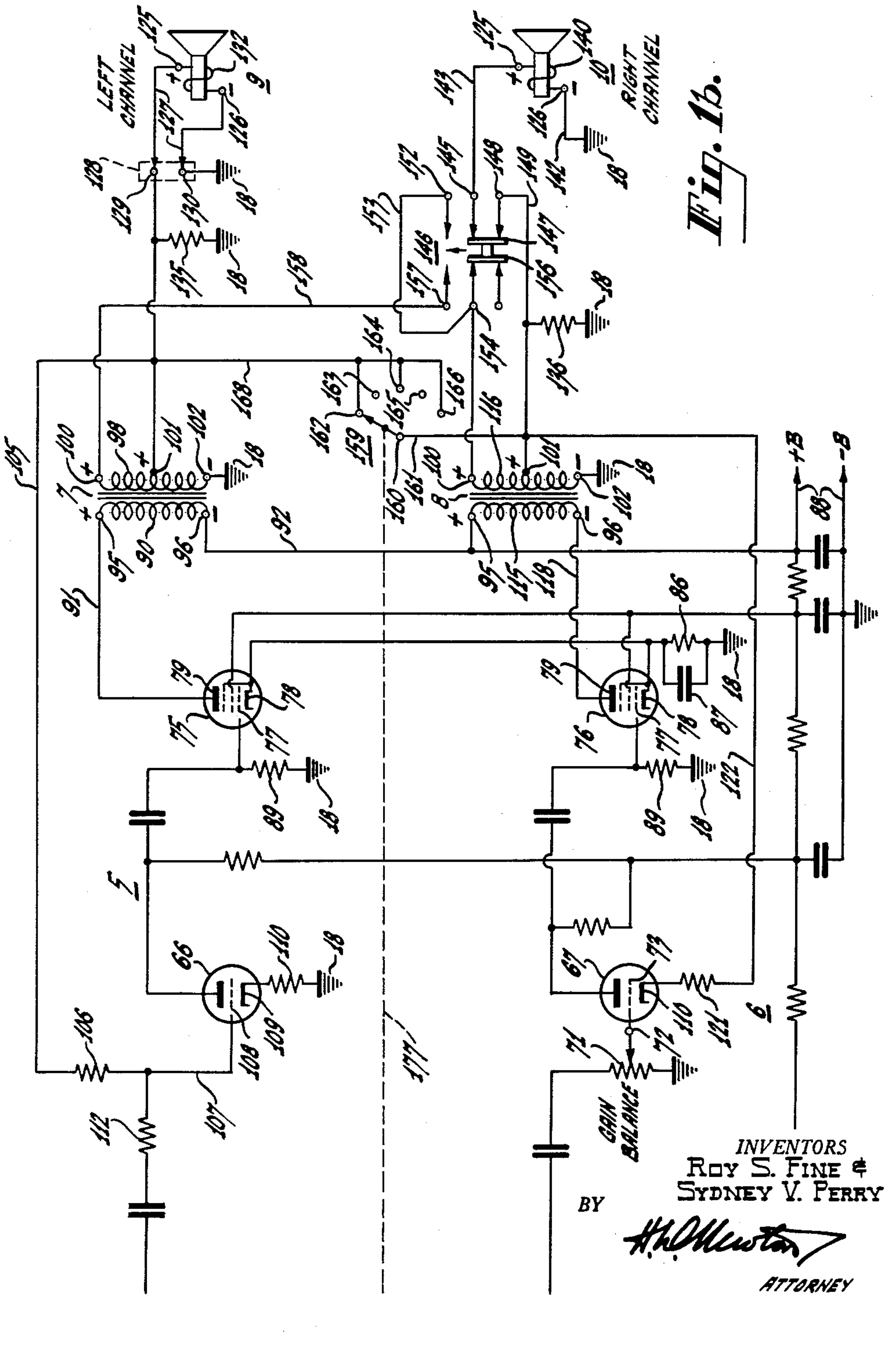

In the drawings, the single figure, comprising FIGURES 1*a* and 1*b*, is a schematic circuit diagram of a dual-channel audio-frequency signal amplifier system embodying the invention.

Referring to the drawings, the dual-channel amplifier system comprises two separate, like or substantially duplicate, amplifiers or amplifier channels 5 and 6, of the multistage, single-ended type, coupled at the output ends, through suitable single-ended output transformers 7 and 8 respectively, to their respective loud speakers or loud speaker systems represented by speakers 9 and 10. The amplifiers may be either of the transistor or of the electronic tube type. In the present example, the amplifiers are of the electronic-tube, resistance-coupled type, as provided in a present commercial embodiment of the invention.

Signals are applied to each amplifier through separate input circuits 11 and 12 which are connected to the input grids of first stage amplifier tubes 14 and 15, respectively, across suitable input grid resistors 17 in each grid circuit. Each resistor is connected to ground or chassis 18 for the amplifier system, which provides a point of common reference potential for the various circuits, and the low potential terminal of each of the input circuits 11 and 12. In the amplifier channel 5 the first stage amplifier tube 14 is coupled to a second stage amplifier tube 20 through a suitable tone control network 22, and a volume control network 24 serially, the latter having a volume control potentiometer 25, the movable contact 26 of which is connected to the input grid 27 of the tube 20. In the tone control network, a high frequency tone control potentiometer 30 and a low frequency tone control potentiometer 31 are provided with similar movable contacts 32 and 33, respectively, for tone control adjustment. It will be noted that both the tone control network and the volume control network are connected to ground 18 for the system.

In a similar manner, the amplifier channel 6 is provided with a tone control network 35 and a volume control network 36 interposed serially in circuit between the input stage amplifier tube 15 and a second stage amplifier tube 38, the signal input grid 39 of which is connected with the volume control contact 40 of the volume control potentiometer 41. In the tone control network, there are likewise provided a high frequency tone control potentiometer 42 having a movable tone control contact 43, and a low frequency tone control potentiometer 45 having a movable tone control contact 46. Both the tone control and volume control networks are connected to chassis or ground 18 as indicated.

It will be noted that the low frequency tone control contacts 33 and 46 are connected, as indicated by the dotted line 48, for unitary or joint operation and simultaneous control of the low frequency tone in both channels. Likewise, the high frequency tone control contacts 32 and 43 are connected, as indicated by the dotted line 49, for unitary or joint operation and simultaneous control of the high frequency tone in both channels, whereby a single low frequency and a single high frequency tone control knob (not shown) may be used for the dual-channel amplifier system. Since the sound volume in a stereophonic amplifier must likewise be adjusted in both channels simultaneously, the volume control potentiometer contacts 26 and 40 are similarly connected for unitary operation, as indicated by the dotted line 50.

It will be noted that the cathodes 54 and 55 of the second stage amplifier tubes 20 and 38, respectively, are connected to chassis ground 18 through a common cathode resistor 56 provided with a bypass capacitor 57, thereby completing the grid-cathode or signal input circuits to each of the amplifier tubes 20 and 38. In a similar manner the cathodes 60 and 61 of the first stage amplifier tubes 14 and 15 are connected to ground 18 through a common cathode resistor 62 having a shunt bypass capacitor 63, whereby the input grid circuits 11 and 12 with common ground 18 are connected between grid and cathode of their respective input stages.

The second stage amplifier tubes 20 and 38 are resistance-coupled to a pair of driver stage tubes 66 and 67, respectively, as shown. The resistance coupling circuit for the tube 67 includes a gain-balance potentiometer 71 having a movable contact 72 connected with the input grid 73 for adjusting the gain in the amplifier channel 6 with respect to the gain in the amplifier channel 5, whereby the volume or sound output from both channels may be equalized for all adjustments of the unitary volume control provided for both channels, as hereinbefore described. It will be noted that the potentiometer 71, 72 is connected in shunt relation to the signal channel and to chassis ground at the low potential end.

The driver amplifier tubes 66 and 67 are resistance coupled to single-ended output amplifier tubes 75 and 76, respectively, each having a signal input grid 77, a cathode 78 and an output anode 79. These may be of any suitable type and are here shown as pentodes. The signal input grids are provided with shunt grid resistors 89 connected to ground 18. As in the preceding amplifier stages, the cathodes are connected to chassis ground 18 through a common cathode resistor 86 shunted by a signal bypass capacitor 87. This common cathode circuit for the various stages is possible since both amplifier channels are in operation simultaneously either for stereophonic or monaural signal amplification. For this reason also, a common anode and grid potential supply circuit, indicated by the positive and negative supply leads 88, may be utilized for both amplifier channels.

In the amplifier channel 5 the single-ended output stage, represented by the amplifier tube 75, is coupled to the loud speaker means 9 for that channel through the output coupling transformer 7. This transformer has a primary winding 90 connected in the output anode circuit 91 between the anode 79 and a positive anode supply lead 92 connected with the positive supply lead 88. The anode circuit 91 is connected to a primary terminal 95 while the other primary terminal 96 is connected with the supply lead 92, whereby the primary winding is connected with a certain polarity relation to the secondary winding, indicated at 98, and the secondary terminals 100, 101 and 102, the last being connected to common ground 18 as indicated, and being the low potential terminal of the secondary winding. The terminal 101 on the secondary winding is an intermediate tap and is connected through a voltage feedback lead 105 and a series feedback control resistor 106 to the grid circuit 107 and the input grid 108 of the driver stage amplifier tube 66. The cathode 109 of the driver stage is connected through a cathode bias resistor 110 to ground 18, whereby the grid-cathode circuit of the driver stage in the channel 5 is completed through the feedback circuit 105 and the portion of the secondary winding 98 between the tap 101 and the ground or low potential terminal 102. In this way voltage feedback in channel 5 is provided for the driver-stage amplifier tube 66. To isolate the grid 108 from the preceding stage, for the injection of feedback voltage, a series isolating resistor 112 is connected between the grid circuit 107 and the coupling connection with the preceding second stage amplifier tube 20, as indicated.

The output transformer 8 for amplifier channel 6 is electrically a duplicate of the output transformer 7 and includes a primary winding 115 having like terminals 95 and 96 as the transformer 7, and similarly poled with respect to the corresponding terminals 100, 101 and 102 of its secondary winding 116. It will be noted that the low potential terminal 102 of the secondary winding 116 is connected to common ground 18 like the secondary winding 98, while the primary winding 115 is reversed in polarity in its connection with the anode 79 of the single-ended driver stage tube 75 through its anode output circuit 118 and the positive anode supply lead 92.

The cathode 120 of the driver stage tube 67 for the amplifier channel 6 is connected through a self-bias resistor 121 and a feedback circuit 122 connected to the intermediate tap 101 on the output transformer secondary winding 116, whereby the grid-cathode circuit of the driver tube 67 is connected through the portion of the secondary winding 116 between the intermediate tap 101 and the ground terminal 102, thereby providing inverse feedback on the driver stage tube 67 corresponding to the inverse feedback on the corresponding driver tube 66 of the amplifier channel 5.

For stereophonic signal amplification, the two single-ended amplifiers or amplifier channels 5 and 6 operate as independent amplifiers to apply amplified signals to their respective loud speaker means 9 and 10 in response to stereophonic signals supplied simultaneously to the two signal input circuits 11—18 and 12—18. For this mode of operation both speaker means are used independently.

The voice coil terminals 125 and 126 of the speaker 9 are connected through a pair of supply leads 127 to a terminal block 128, or other suitable connection means, having terminals 129 and 130 connected respectively with the intermediate terminal 101 and ground 18, for receiving output signals from the secondary winding at the terminals 101 and 102 at a nominal impedance to match the impedance of the speaker 9, that is, the voice coil 132. The latter is connected between the terminals 125 and 126 in a predetermined polarity relation thereto, marked for reference as plus and minus, as indicated. The secondary or output winding 98 between the intermediate terminal 101 and the ground terminal 102 may be assumed by way of example to match the impedance of the voice coil 132 at a nominal impedance of 4 ohms, and between the end terminal 100 and the ground terminal 102, the winding 98 may then be assumed to have a nominal impedance of 8 ohms.

The winding 98 is provided with a protective shunt load resistor 135 to prevent amplifier oscillation if the loud speaker load is removed, and is connected for this purpose between the terminals 101 and 102 through ground, as indicated. This may have an impedance in the present example of substantially 47 ohms. A similar protective load resistor 136 is provided for the secondary winding 116 and is similarly connected between the terminals 101 and 102 through ground 18 and may be of the same resistance value.

In the amplifier channel 6, the output speaker means, represented by the speaker 10, is provided with a voice coil 140 poled with respect to its terminals 125 and 126 the same as the voice coil 132 for the speaker 9 and is similarly polarity marked. This speaker is connected to ground 18 at the terminal 126 through a lead 142 and thence to the ground terminal 102 of the secondary winding 116. The terminal 125 is connected through a lead 143 to one contact 145 of a triple-pole double-throw switch 146, and through a movable contact element 147 therein, to a second contact 148 which in turn is connected through a lead 149 with the output or secondary terminal 101, thereby connecting the speaker 10 across the secondary winding 116 between the terminals 101 and 102, similarly poled and in the same manner as the speaker 9 is connected between the corresponding terminals of the secondary 98. Therefore, for the in-phase signals in the secondary windings 98 and 116, the speakers 9 and 10 operate in proper in-phase relation. As shown and as connected, and thus far described, the two channels and the respective speaker means are independent and provide for normal functioning as two single-ended stereophonic amplifiers for stereophonic signal reproduction.

For this reason the two channels 5 and 6 may be considered to represent the left and right-hand channels of the stereophonic amplifier system, and the speakers 9 and 10 may be considered to be spaced to the left and right, respectively, in front of a listener, and are so labelled in the drawing, for further reference. However, being equal, the channel designations could be reversed, with the understanding that the speakers 9 and 10 would be reversed in their placement with respect to a listener, for stereophonic sound reproduction.

Since the speakers must be spaced preferably several feet apart for effective stereophonic sound reproduction, only one speaker or speaker system, represented in the present example by the speaker 10, is generally included with and as part of the radio, television, tape or phonograph-record playing equipment with which it is used. The other channel speaker or speaker system, represented by the speaker 9 in the present example, is housed separately for placement in proper spaced relation to the first speaker, and where stereophonic reproduction is not required initially, may in the interests of economy, be omitted.

The speaker or speaker system included with the equipment, such as the speaker 10, may, therefore, be connected therewith by direct circuit connections permanently, whereas the external speaker or speaker system, such as the speaker 9, may be connected detachably to the equipment as indicated by the speaker supply leads 127 and their connection with the terminals 129—130 of the terminal block 128.

For monaural signal reproduction, as hereinbefore referred to, the two signal channels of the amplifier system, in accordance with the invention, operate in push-pull or out-of-phase relation but with the speaker output circuits or output transformer secondary windings connected for operation in parallel and in-phase relation. With the low potential terminals 102 of the output transformer secondary windings or output circuits connected together through ground and to the like polarity terminals of the two speakers, the secondary or output circuits may then be connected in parallel for in-phase operation by a simple switching connection provided between the intermediate terminals 101 or between the end terminals 100 of the two secondary windings. In accordance with the invention, either or both connections may be provided. As shown in the present example, both are provided and for different purposes, depending upon whether the amplifier system is to be used exclusively for monaural signal reproduction or for both monaural and stereophonic signal reproduction. The exclusive monaural operation would be for the purpose of economy, and would include the reproduction of stereophonic signals monaurally, utilizing only the lateral signal components for example, as in the reproduction of stereophonic sound records monaurally and through one speaker or speaker system, as well as in the reproduction of purely monaural signals.

Where economy of operation is desired through the use of one speaker or speaker system provided with the equipment, impedance matching, as hereinbefore mentioned, is provided by the higher impedance connection terminals 100 on each secondary winding, which have effectively double the impedance provided at the normal output terminals 101, with respect to the ground or common terminals 102. Otherwise, a speaker of a lower nominal impedance of 2 ohms, for example, would have to be substituted, and this would present an undesirable service problem with such equipment.

In the present example, therefore, for monaural signal reproduction through one speaker, no left channel speaker is provided and hence may be assumed to be disconnected at the terminals 129—130, leaving only the main speaker 10 for use with the equipment. This is then disconnected from the terminal 101 and connected to the 8-ohm terminal 100 of the secondary 116. This change is made by operation of the triple-pole double-throw switch 146 to move the contact element 147 in engagement with the contact 145 from the fixed contact 148 into engagement with a fixed contact 152 which is connected through a lead 153 to a fixed contact 154 of the switch and thence to the terminal 100. A second movable contact element 156 is connected with but insulated from the movable contact 147 to move simultaneously therewith and connect the fixed contact 154 with a fixed contact 157 which, in turn, is connected through a lead 158 with the end terminal 100 of the output transformer secondary 98 for the other signal channel.

By this improved and simplified speaker switching circuit the terminals 100 are connected to provide parallel in-phase operation of the two secondary windings and at the same time provide proper impedance matching with the single speaker 10 for effective monaural signal amplification as hereinbefore described, with one speaker outlet for both channels. The speaker switching circuit further provides that when the second speaker or speaker system, such as the speaker 9, is available, each signal channel may then be connected with its own individual speaker outlet, whether used for monaural signal amplification alone or for both monaural and stereophonic signal amplification. In this case, the switch 146 is maintained with its movable contact elements in the position shown in the drawing, to provide the speaker connection with the lower impedance terminals 101 and 102 of the output secondary winding 116 for channel 6. The speaker 10 is connected, as shown, through the terminal block 128 across the lower impedance terminals 101 and 102 of the output transformer secondary winding 98 for channel 5. With the switch 146 in the normal position shown, the parallel connection through the lead 158 between the secondary windings 98 and 116 is open.

Since the two speakers are connected for operation with their individual signal channel amplifiers in this mode of operation, the two secondary windings may be connected in parallel for monaural signal amplification through simple two-point switch means connected between the terminals 101 of the two secondary windings, and operated to open and close the connection as required for the different functions of the equipment. In the present example, the switch 159 is for this purpose and is of the rotary multiple-position selector type having a movable contact 160 connected through a lead 161 with the terminal 101 of the secondary 116, and having five fixed contacts 162—166, alternate ones of which, 162, 164 and 166, are connected through a lead 168 with the terminal 101 of the secondary 98. The contacts 163 and 165 are blank to provide an open circuit condition for full stereophonic operation of the two channels with the amplifiers operating independently for those positions of the movable contact 160, as will hereinafter appear, while in the position shown and for corresponding other contacts 164 and 166, the switch is closed to connect the two output circuits in parallel for monaural signal amplification through the two channels as hereinbefore described, but with both speakers in operation.

From the foregoing description it will be seen that the signal channels may provide monaural signal ampification with either one speaker or both speakers, and in either case the secondary or output circuits are connected for parallel in-phase operation by closing single-point switch means connected between corresponding terminals of points of substantially equal voltage on the output secondary windings.

If a single speaker is used in place of the two speakers, it has been pointed out that for proper impedance matching, its nominal impedance should be half that of either of the two speakers normally provided, and that since one of the speakers, such as the speaker 10 in the present example, is incorporated in the equipment as a part thereof, it would not be practical to change the speaker to one having half the nominal impedance. Therefore, both secondary windings are provided with the higher impedance tap points or terminals 100 for matching the single equipment speaker when connected in parallel. The simple switching circuit, provided in connection with the switch 146, simultaneously connects the single speaker to both high impedance tap points or terminals 100 and provides the parallel connection between the two channels as required in accordance with the invention for monaural push-pull operation of the dual-channel amplifier system.

The switch 159, however, opens and closes the parallel connection between the two channels at the low impedance terminals 101, effectively as a two-point switch. In the present example, it is a multiple-position switch for operation with and as part of function selector switch means for the amplifier system which includes two other multiple-position selector switches 170 and 171, having movable contacts 173 and 174 respectively, connected with the respective input circuits 11 and 12 for the two signal channels. The movable contacts 173 and 174 are mechanically connected with the movable contact 160 of the switch 159 for unitary or gang operation therewith, as indicated by the dotted lines 176 and 177, and have the same number of operation positions as the contact 160. A greater or lesser number of positions may be provided, depending upon the number of functions for which the amplifier system is to be used in any case.

In the present example, the selector switch means is arranged to provide for five operating functions of the amplifier system in a radio-phonograph combination. Starting with the position shown and reading in a clockwise direction therefrom: Position 1 provides for phonograph signal reproduction monaurally in connection with a stereophonic phonograph pickup 180 or other source of stereophonic or "push-pull" signals; position 2 provides for phonograph signal reproduction stereophonically from the same source; position 3 provides for monaural sound signal reproduction from any single-ended monaural sound-signal source such as a radio or television receiver 182; and positions 4 and 5 provide tape sound-signal reproduction, respectively, stereophonically and monaurally. These switch positions are designated in a combination instrument for use in the home entertainment field, for example, as (1) Phono Single, (2) Phono Stereo, (3) Tuner, (4) Tape Stereo and (5) Tape Single. This arrangement of functions is typical of equipment to which the invention is particularly adapted.

In the present selector switch means the selector switch 170 operates to connect the input circuit 11—18 and the left-channel amplifier 5 selectively to the three signal sources indicated, while the selector switch 171 operates to connect the input circuit 12—18 and the right-channel amplifier 6 to the same signal sources. The first and second contacts 182 of the selector switch 170 are connected through an input lead 183 and an input terminal board 184 with a shielded output conductor 186 for a left-channel pickup element 188 of the pickup 180. In a similar manner the first and second contacts 190 of the selector switch 171 are connected through an input lead 191 and the termnial board 184 with a second shielded output conductor 192 for a right-channel pickup element 194 of the pickup 180. The two pickup elements 188 and 194 are connected to a common stylus element 196 for joint operation when playing a phonograph record 197 of the stereophonic or monaural type on a suitable turnable 198. The common connection of the two pickup elements 188 and 194 with the stylus element 196 is also provided with a common electrical output connection with the amplifier channels through a lead 199 and a grounded shield conductor 200 surrounding the output conductors 186 and 192. At the amplifier terminal board 184 the shield conductor 200 is connected with a terminal 201 having a ground connection 18, which is common to both amplifier channels, as hereinbefore described. Each of the input leads, between the terminal board 184 and the switch contacts 182 and 190, includes a series filter resistor 203 and a shunt filter capacitor 204 for adjusting the frequency response of the pickup elements 188 and 194.

With the selector switch means in the first or the second positions, it will be seen that the input circuit 11—18 is connected with the left channel pickup element 188, while the input circuit 12—18 is connected with the right channel pickup element 194, whereby sound signals picked up from the record are translated by the pickup and applied to the two channels of the amplifier. However, when the selector switch means is in the first position, the selector switch 159 is closed to tie the channel output ends in parallel, thereby to effect cancellation of the vertical signal response from the pickup 180, as hereinbefore described. In the second position of the selector switch means, the selector switch 159 is open to permit the two amplifier channels to operate independently for full stereophonic response from the pickup 180.

The pickup 180 may be of any commercially available type for stereophonic sound reproduction, such as a dual crystal or ceramic type, wherein the elements 188 and 194 are arranged at substantially 45 degrees with respect to the vertical axis of the single stylus element 196 which is provided with both vertical and lateral compliance to respond to right and left-hand recordings in a single groove of the record being played for stereophonic reproduction. The pickup output circuit is such that for the lateral signal components of a stereophonic recording the two signal generating pickup elements 188 and 194 operate in push-pull relation to provide push-pull or out-of-phase signals, at the two output leads 186 and 192, which are applied directly to the input grid circuits 11 and 12. The vertical signal components of a stereophonic recording provide output signals from the two pickup elements 188 and 194 which are in phase at the two output leads 186 and 192, and when both channels 5 and 6 are operated independently, as for stereophonic sound reproduction, both signal components are amplified and reproduced through the two speaker systems. When the two channels are connected at the output circuits, as when the selector switch 159 is closed as shown, monaural reproduction is possible, from either stereophonic and monaural records, with the vertical signal components, which include rumble, noise and distortion, cancelling in the parallel connected output circuits for the two channels.

The signal receiver 182, representing any single-ended or monaural signal source, is provided with an audio-frequency or modulation signal output circuit comprising a conductor 210 and a shield conductor therefor 211. The conductor 210 is connected through an input terminal board 212 and an input lead 213 with a third contact 214 on the selector switch 170 for the left channel input circuit 11—18. The shield conductor 211 is connected to a grounded terminal 215 on the terminal board, thereby completing the input circuit from the signal receiver directly to the left channel amplifier 5 when the switch contact 173 is moved to the contact 214. In this position the contact 174 for the input circuit 12—18 of the right channel amplifier 6 is connected to a corresponding third contact 216, which is connected through an input lead 217 and the terminal board 212 with the shielded signal conductor 210 through a phase inverter 220. As referred to hereinbefore, this may be of any suitable type, such as a single-stage zero-gain transistor or electronic tube amplifier. The ground connection for the phase inverter is provided with the terminal 215 as indicated and with the shield conductor 211 thereby completing the signal receiver modulation or audio-frequency output circuit to the right channel amplifier input circuit 12—18 through the phase inverter.

The nonaural signal output from the signal receiver is thus applied to the two signal amplifying channels 5 and 6 in push-pull or out-of-phase relation, and due to the reversal of the primary winding 115 in the channel 6, the two resultant out-of-phase signals are in-phase in the secondary output circuits, as hereinbefore described. The selector switch 159 is closed to the contact 164, thereby placing the channel output circuits in parallel for monaural signal operation.

The tape input connection for the amplifier system is similar to that provided for the stereophonic pickup and comprises a terminal board 222 having a grounded terminal 223, an input terminal 224 connected through an input lead 225 with switch contacts 226 for the fourth and fifth switch positions of the selector switch 170. In a similar manner, the corresponding switch contacts 226 of the selector switch 171 are connected through an input lead 227 with a third input terminal 228 at the terminal board 222.

When the switch contacts 173 and 174 are moved to the fourth and fifth positions for connection with the tape input terminals of the amplifier system, the selector switch 159 is operated to move the contact 160 into engagement with the contacts 165 and 166 for the fourth and fifth positions respectively. Therefore, for the fourth position, with the contact 160 connected with the contact 165, the two amplifier channels operate independently for stereophonic signal reproduction through the tape input terminals. When the selector switch means is moved to the fifth position the switch contact 160 is moved into engagement with the contact 166 thereby connecting the two channels in parallel at the output circuits and providing for the push-pull or out-of-phase monaural operation of the amplifier system in which the in-phase signals in the two channels are cancelled in the output circuits, as for other monaural signal amplification, as hereinbefore described.

When amplifying either monaural or stereophonic signals, it will be seen that the tone and volume control means provide dual control of both channels at all times and that any unbalance in the sound output from the two channels may be corrected by the gain balance means 71—72 in channel 6.

From the foregoing description it will be seen that the two amplifiers or amplifier channels 5 and 6 provide two normally separate signal channels for stereophonic signal amplification, which are connected for push-pull or out-of-phase operation from monaural signals such as the modulation signal output of the receiver 182, or the out-of-phase lateral signal components of the phonograph pickup 180. The switching arrangement is such that the input circuits of the two amplifiers are connected with the same signal source, such as the receiver 182 or pickup 180, and the source may be either stereophonic or monaural. The input signal to one channel is inverted for monaural signals from a monaural source, and the two channels are operated in push-pull or out-of-phase relation. In order that the output signals from the two amplifiers or channels may be in phase at the loud speakers or output circuits, with the operational advantages herein described, a second inversion is made in the one channel, preferably as by reversal of the primary terminal connections 95—96 for the output transformer 8 of the channel 6 in the present example. As described, when the secondaries or output circuits are connected in parallel, even-order harmonic distortion and out-of-phase signal components are cancelled. Likewise, any undesired vertical response from a monaural or a stereophonic pickup results in signals being transmitted through the two channels in phase and these are cancelled in the output circuit with the secondaries connected in in-phase relation.

Thus, a stereophonic phonograph pickup, in connection with an amplifier system embodying the invention, provides effective means for the reproduction of both monaural records or stereophonic records monaurally from the same pickup device, as well as for the reproduction of stereophonic records in the normal manner stereophonically, without change in the circuit or in the pickup device, and the change from monaural to stereophonic operation may be affected by simple switching means for opening and closing a connection between the two output or secondary circuits.

The present amplifier system, with a stereophonic pickup for record reproduction, may provide less vertical rumble signal component in the output circuit during monaural reproduction from either monaural or stereophonic records than during full stereophonic reproduction. This is advantageous, particularly when playing older monaural recordings. It may be noted that the use of separate push-pull output stages in each amplifier channel, involving a greater cost and two more tubes or transistors, would not provide the cancellation of vertical rumble signal components and distortion as provided by the present amplifier circuit.

Furthermore, the terminal arrangement of the secondary windings of the output transformers may be alike or in duplicate for more readily providing proper phasing for speakers or speaker systems connected therewith and for impedance matching for single speaker operation with both signal channels. Thus, the two independent speakers or speaker systems for stereophonic signal reproduction may operate in parallel for monaural signal reproduction, or a single speaker or speaker system may be used for monaural operation of the system without change in the manner of interconnecting the two signal channels and without complicated circuit switching. Since both channels are always in operation, whether for monaural or stereophonic signal reproduction, there is no loss in power handling capacity when switching from stereophonic to monaural signal reproduction, even with one speaker or speaker system.

It will be seen, therefore, that an improved, low cost audio-frequency amplifier system for stereophonic or dual-channel signals may be provided in accordance with the invention for effective monaural or single-channel signal amplification with a minimum of circuit switching. Furthermore, an improved dual-channel audio-frequency signal amplifying system in accordance with the invention provides two separate single-ended amplifying channels and transformer-coupled output speaker means for each channel for stereophonic sound reproduction, which is adapted for monaural signal reproduction through both channels in push-pull or out-of-phase relation, with even-order harmonic cancellation and the same power output as for stereophonic signal reproduction.

What is claimed is:

1. A dual-channel audio frequency amplifier system for monaural and sterophonic signals comprising in combination, a pair of single-ended multistage amplifiers each having a signal input circuit and a signal output circuit, a signal output transformer for each of said amplifiers, said transformers having like primary and like secondary windings, circuit means connecting the primary winding of one transformer with the output circuit of one amplifier in a predetermined polarity relation thereto, circuit means connecting the primary winding of the other transformer with the output circuit of the other amplifier in a reverse polarity relation thereto, means including a switch for connecting the secondary windings in parallel relation for in-phase operation, and means for opening said switch and applying audio frequency signals to said input circuits in parallel relation and for closing said switch and applying audio-frequency signals to said input circuits in push pull relation, for selective stereophonic and monaural signal amplification through both channels.

2. A dual-channel audio-frequency amplifier system comprising in combination, a pair of single-ended multistage amplifiers providing parallel signal amplifier channels each having a signal input circuit and a signal output circuit, a signal output transformer for each of said amplifier channels, said transformers having like primary and like secondary windings, circuit means connecting the primary winding of one transformer with the output circuit of one amplifier channel in a predetermined polarity relation thereto, circuit means connecting the primary winding of the other transformer with the output circuit of the other amplifier channel in a reverse polarity relation thereto, means including a first switch for connecting the secondary windings in parallel relation for in-phase operation, means including a second switch providing speaker output connections with each of said secondary windings having operating impedances for single-speaker matching to each winding with said second switch open and to both windings in parallel with said second switch closed, and means for opening said first switch and applying audio frequency signals to said input circuits for independent dual-channel stereophonic signal amplification and individual speaker operation and for closing said first switch for dual-channel monaural signal amplification and single-speaker operation.

3. A dual-channel audio-frequency amplifier system for monaural and stereophonic signals comprising in combination, a pair of single-ended multistage amplifiers providing parallel signal amplifier channels each having a signal input circuit and a signal output circuit, a signal output transformer for each of said amplifier channels, said transformers having like primary and like secondary windings with like terminals and terminal polarities, circuit means connecting the primary winding of one transformer with the output circuit of one amplifier channel in a predetermined polarity relation with respect to the winding terminals, circuit means connecting the primary winding of the other transformer with the output circuit of the other amplifier channel in a reverse polarity relation with respect to the winding terminals, means connecting the secondary windings in parallel relation including a switch for selectively opening and closing a connection between two terminals of like polarity, and means for selectively opening said switch connection and connecting said amplifiers for applying stereophonic signals to said input circuits in parallel relation and for closing said switch connection and connecting said amplifiers for applying monaural signals to said input circuits in push-pull or out-of phase relation.

4. A combined monaural and stereophonic signal amplifier system comprising in combination, a pair of single-ended multistage amplifiers for dual-channel operation, each having a signal input circuit connected to an input stage and a signal output circuit connected to a single-ended output stage, a signal output transformer for each of said channels, said transformers having like primary and like secondary windings with like terminals and terminal polarities, circuit means connecting the primary winding of one transformer with the output circuit of one amplifier channel in a predetermined polarity relation with respect to the winding terminals, circuit means connecting the primary winding of the other transformer with the output circuit of the other amplifier channel in a reverse polarity relation with respect to the winding terminals, means connecting the secondary windings in parallel relation including a switch for selectively opening and closing a connection between two terminals of like polarity, and means including a selector switch connected with each of said input circuits and jointly operable with said first-named switch for opening said switch connection and connecting the input circuits for separate-channel signal amplification and for closing said switch connection and connecting the input circuits for signal amplification through both channels in parallel.

5. A stereophonic signal amplifier system comprising in combination, a pair of single-ended multistage amplifiers providing parallel signal channels, each having a signal input circuit connected to an input stage and a signal output circuit connected to an output stage, a signal output transformer for each of said channels, said transformers having like secondary windings with like output terminals and terminal polarities, means providing individual speaker circuit connections with the terminals of each secondary winding, circuit means connecting one transformer with the output circuit of one channel in predetermined polarity relation thereto, circuit means connecting the other transformer with the output circuit of the other channel in a reverse polarity relation thereto, means connecting the secondary windings in parallel relation including a switch for selectively opening and closing a connection between two of said terminals of like polarity, a single-ended monaural signal supply circuit, a dual-channel stereophonic signal supply circuit, a signal phase inverter, and means including a selector switch connected with each of said input circuits and jointly operable with said first-named switch, for connecting the input circuits with said stereophonic signal supply circuit and with said switch connection open for parallel separate-channel stereophonic signal amplification, and for connecting said input circuits with said monaural signal supply circuit directly for said one channel and indirectly for the other channel through said phase inverter with said switch connection closed, for push-pull or out-of-phase monaural signal amplification and cancellation of even-order harmonic distortion in said parallel connected secondary windings.

6. A stereophonic signal amplifier system as defined in claim 5, wherein the means providing individual speaker circuit connections with the terminals of each secondary winding include a switch for changing one speaker circuit connection from a lower impedance output terminal on one secondary winding to higher impedance output terminals on both secondary windings in parallel.

7. A dual-channel audio-frequency signal amplifier system comprising a pair of single-ended amplifiers providing two like amplifier channels for stereophonic signals, individual output speaker means for each channel transformer coupled thereto in like polarity relation and with signal phase inversion included in the output coupling with one channel whereby the system is responsive to out-of-phase signals in the amplifier channels to provide in-phase signal output therefrom to said individual speaker means, means providing a switch connection between said amplifier channels for in-phase parallel operation of said speaker means and even-order harmonic distortion cancellation, in response to applied out-of-phase signals at the input ends of said channels, and means connected with the input ends of said channels for selectively applying thereto stereophonic signals with the switch connection open and out-of-phase signals with the switch connection closed.

8. A dual-channel audio-frequency signal amplifier system comprising a pair of single-ended amplifiers, speaker output means for each amplifier transformer coupled thereto, means providing signal phase inversion for one amplifier at the input and at the output ends thereof, said last-named means including a phase inverter connected with the input end of said one amplifier and a polarity reversal in the transformer coupling at the output end thereof, whereby monaural signals applied to said amplifiers from a single source provide out-of-phase signal amplification through said amplifiers and in-phase signal output therefrom to said speaker means, and switch means connecting said speaker means in parallel for monaural signal reproduction and effective cancellation of even-order harmonic distortion.

9. A dual-channel stereophonic amplifier system, comprising a pair of single-ended multistage amplifiers providing parallel signal channels connected by internal phase inversion in one channel for push-pull or out-of-phase dual-channel operation from monaural signals and out-of-phase componetns of stereophonic signals from a single source, means providing a speaker output circuit for each signal channel, means providing a parallel connection between said output circuits for in-phase operation thereof to cancel even-order harmonic distortion components in said output circuits in response to out-of-phase operation of said amplifier channels, and means for opening said connection for stereophonic signal amplification and for closing said connection for monaural signal amplification.

10. The combination with a stereophonic phonograph pickup having two signal output circuits, of a dual-channel stereophonic amplifier system comprising a pair of single-ended multistage amplifiers providing parallel signal channels connected with said pickup output circuits, one of said amplifier channels further including phase inversion means in one channel at the output end thereof for push-pull or out-of-phase dual-channel operation from monaural signals and out-of-phase components of stereophonic signals from said stereophonic phonograph pickup, means providing a speaker output circuit of a predetermined operating impedance for each signal channel, means providing a parallel connection between said speaker output circuits for in-phase operation thereof to cancel even-order harmonic distortion components in said output circuits in response to out-of-phase operation of said amplifier channels, and means for opening said connection for stereophonic signal amplification from said pickup and for closing said connection for monaural signal amplification from said pickup.

11. The combination as defined in claim 10, wherein a speaker output connection is provided on each channel having an operating impedance substantially double that of said speaker output circuits, and wherein a single speaker is selectively connectable with one of said speaker output circuits for stereophonic signal amplification from said pickup and with both of said speaker output connections in parallel for monaural signal amplification from said pickup.

12. A dual-channel stereophonic amplifier system comprising in combination, a pair of single-ended multistage amplifiers providing parallel signal channels connected by internal phase inversion in one channel for push-pull or out-of-phase dual-channel operation from monaural signals and out-of-phase components of stereophonic signals form a single source, means for selectively connecting said pair of amplifier channels with any one of a plurality of stereophonic and monaural signal sources, means connected in circuit with said last-named means providing monaural signal phase inversion at the input end of said one channel, means providing a speaker output circuit for each signal channel, means providing a parallel connection between said output circuits for in-phase operation thereof to cancel even-order harmonic distortion components in said output circuits in response to out-of-phase operation of said amplifier channels, and means for opening said connection for stereophonic signal amplification and for closing said connection for monaural signal amplification.

13. In a stereophonic amplifier apparatus of the type including an internal loudspeaker system and terminals for connection to an external loudspeaker system, the combination comprising a pair of amplifier channels connected for push-pull dual channel operation for applied monaural signals, an output circuit for each of said channels including an output transformer having primary and secondary windings with first and second terminals, means connecting together the first terminals of the secondary windings of each of said output transformers to provide phase inversion of signals through one of said output transformers relative to the other transformer for in-phase operation of said output circuits to reduce distortion components in said output circuits in response to monaural signal operation of said amplifier apparatus, at least one of said secondary windings having an intermediate third terminal at an impedance point on said winding which is lower than that of the second terminal of said one secondary winding with respect to the first terminal thereof, and switch means having a first position for operation of said apparatus with said internal loudspeaker system, and a second position for operation when an external loudspeaker system is connected to said apparatus, said switch means in the first position thereof connecting together the second terminals of said secondary windings and connecting said first and second terminals to said internal loudspeaker system whereby said secondary windings are connected in parallel to drive said internal loudspeaker system, said switch means in the second position thereof connecting the first and third terminals of said one secondary winding to said internal loudspeaker system and the other secondary winding to the terminals for connection to an external loudspeaker system.

14. In a stereophonic amplifier apparatus of the type including an internal loudspeaker system and facilities for energizing an external loudspeaker system from said apparatus, the combination comprising a pair of amplifier channels connected for push-pull dual channel operation for applied monaural signals, an output circuit for each of said channels including an output transformer having primary and secondary windings, means connecting one of said output transformers to provide phase inversion of signals therethrough relative to the other transformer, switch means having a first position for connecting said secondary windings in parallel to said internal loudspeaker system for in-phase operation of said secondary windings to cancel distortion components in said output circuits, and a second position for connecting a smaller portion of one of said secondary windings to said internal loudspeaker system than is connected thereto in the first position of said switch and connecting the other of said secondary windings to the facilities for energizing an external loudspeaker system.

15. In a stereophonic amplifier apparatus of the type including an internal loudspeaker system and facilities for energizing an additional loudspeaker system from said apparatus, the combination comprising a pair of amplifier channels connected for push-pull dual channel operation for applied monaural signals, an output circuit for each of said signals including an output transformer having primary and secondary windings, means connecting one of said output transformers to provide phase inversion of signals therethrough relative to the other transformer, switch means having a first position for connecting said secondary windings in parallel to said internal loudspeaker system for in-phase operation of said secondary windings to cancel distortion components in said output circuits, the impedance of said secondary windings in parallel approximating that of said internal loudspeaker system, said switch means having a second position for connecting a smaller portion of one of said secondary windings to said internal loudspeaker system than is connected thereto in the first position of said switch and connecting the other of said secondary windings to the facilities for energizing an external loudspeaker system, the impedance of said smaller portion of said one secondary winding approximating that of said internal loudspeaker system.

References Cited in the file of this patent

UNITED STATES PATENTS

| | | |
|---|---|---|
| 2,093,540 | Blumlein | Sept. 21, 1937 |
| 2,160,506 | Kolb | May 30, 1939 |
| 2,292,035 | Becker | Aug. 4, 1942 |
| 2,536,664 | Sinnett et al. | Jan. 2, 1951 |
| 2,698,379 | Boelens et al. | Dec. 28, 1954 |
| 2,785,226 | Cook | Mar. 12, 1957 |

FOREIGN PATENTS

| | | |
|---|---|---|
| 477,727 | Great Britain | Jan. 5, 1938 |
| 443,499 | Italy | Dec. 22, 1948 |